United States Patent
Levine

(10) Patent No.: US 7,100,825 B2
(45) Date of Patent: Sep. 5, 2006

(54) NON-COMPUTING NAVIGATION SYSTEM

(76) Inventor: Alfred B. Levine, 9005 Seven Locks Rd., Bethesda, MD (US) 20817

( * ) Notice: Subject to any disclaimer, the term of this patent is extended or adjusted under 35 U.S.C. 154(b) by 1893 days.

(21) Appl. No.: 09/814,054

(22) Filed: Mar. 22, 2001

(65) Prior Publication Data

US 2001/0032880 A1 Oct. 25, 2001

Related U.S. Application Data

(60) Provisional application No. 60/198,667, filed on Apr. 20, 2000, provisional application No. 60/222,592, filed on Aug. 2, 2000, provisional application No. 60/245,587, filed on Nov. 6, 2000.

(51) Int. Cl.
*G07B 15/02* (2006.01)

(52) U.S. Cl. .............. 235/384; 235/462.01; 701/209; 701/223

(58) Field of Classification Search .............. 235/384, 235/462.01, 462.25; 340/988, 991, 992; 701/209, 223, 224
See application file for complete search history.

(56) References Cited

U.S. PATENT DOCUMENTS

| | | | | |
|---|---|---|---|---|
| 4,757,455 A | * | 7/1988 | Tsunoda et al. | 340/988 |
| 5,587,911 A | * | 12/1996 | Asano et al. | 340/995 |
| 5,682,030 A | * | 10/1997 | Kubon | 235/462.25 |
| 5,844,505 A | * | 12/1998 | Van Ryzin | 340/905 |
| 6,018,697 A | * | 1/2000 | Morimoto et al. | 340/988 |
| 6,208,932 B1 | * | 3/2001 | Ohmura et al. | 340/988 |
| 6,213,401 B1 | * | 4/2001 | Brown | 235/486 |

* cited by examiner

*Primary Examiner*—Steven S. Paik

(57) ABSTRACT

A vehicle navigation system for guiding a vehicle to a preselected destination by continually communicating the heading direction to be followed regardless of any detours away from a direct heading. In one embodiment, a two phase system is provided to initially guide the vehicle to a zonal area containing the destination, and in the second phase, guiding the vehicle, by communicating local information, directly to a specific destination within said zonal area. The system can employ bar coded signs being read by a remote reader on the vehicle to obtain detailed information concerning the vehicle location, the streets-roads in the vicinity of each sign, traffic control information, parking and fuel availability, and specific street-road address information.

18 Claims, 2 Drawing Sheets

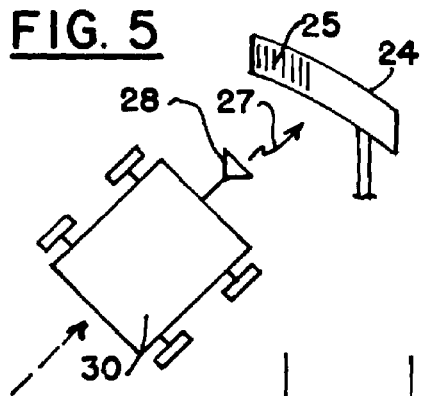
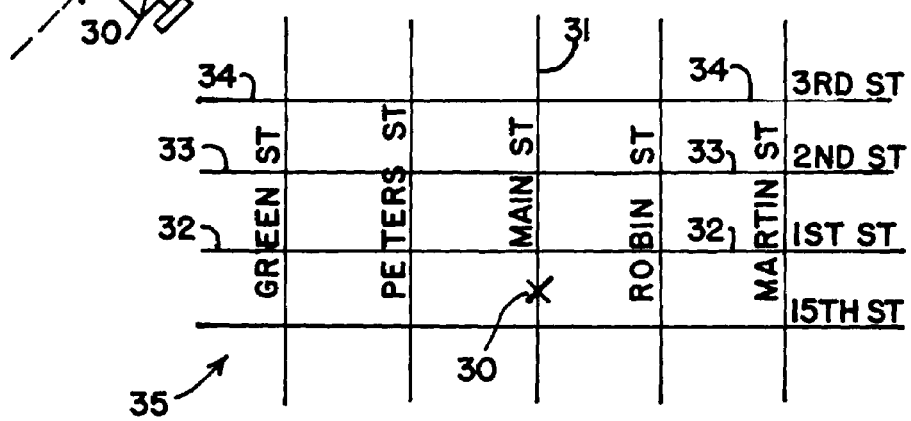
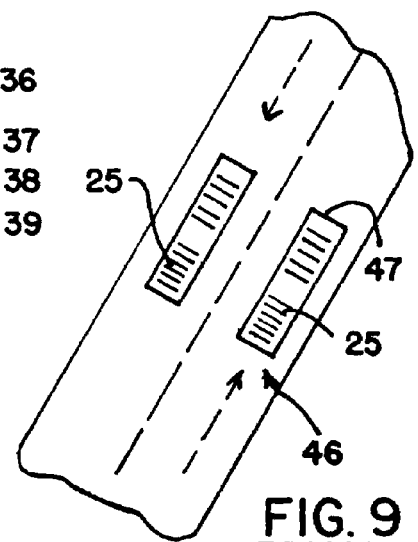
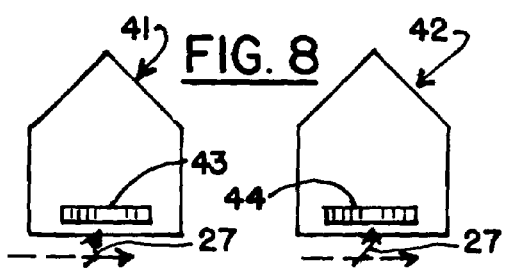

NON-COMPUTING NAVIGATION SYSTEM

STATEMENT OF INVENTION

This application claims the benefit of provisional applications No. 60/198,667, filed Apr. 20, 2000; No. 60/222,592 filed Aug. 2, 2000; and No. 60/245,587 filed Nov. 6, 2000.

This invention generally relates to vehicle navigation systems, and more particularly to such systems using bar coded signs for guiding a vehicle by incremental changes in direction.

BACKGROUND

Current navigation systems often seek to to guide vehicles along predetermined street routes that often result in delays due to traffic congestion, road repairs, and changes in the streets and roads. Many of such systems employ maps stored in the vehicle ststem memory that are used to provide such routing and therefore such systems periodically require updated maps to correct for later changes in the streets or roads after the earlier maps were initially installed.

SUMMARY OF THE INVENTION

According to the invention there is provided a navigation system that progressively guides a vehicle toward a desired destination by incremental changes in heading direction. Thus whenever the vehicle is detoured away from a direct routing toward the destination, due to traffic congestion, road repairs, accidents, or for other reason, the system continually provides a new heading direction as needed from each different location to reach a selected destination.

In one preferred embodiment, the vehicle is initially guided to a zone or area containing the selected destination using bar coded street or road signs. After reaching that zone, the system then provides more detailed local information, using bar coded street signs, to guide the vehicle to the specific street or road within that zone, and ultimately guides the vehicle to a selected local address on the desired street or road. Local traffic restrictions, such as one way streets, or road repairs, are also provided by said instructions as well as supplemental local information, such as the availability of parking lots, gasoline, and service facilities to assist and minimize delays in navigating the vehicle. GPS and other wirelessly transmitted information may additionally or alternatively be used.

BRIEF DESCRIPTION OF THE DRAWINGS

FIG. 5 is a schematic diagram illustrating the scanning of a bar coded street sign by a passing vehicle, FIG. 6 is a plan view of the receiver screen showing street and road information being displayed, FIG. 7 is a plan view of the receiver screen similar to FIG. 6, but showing additional local information in tabulated form, FIG. 8 is a diagrammatic view showing bar coded building signs and the reading of such signs by passing vehicles, and FIG. 9 illustrates the bar coded signs embedded in the roadway.

DETAILED DESCRIPTION OF PREFERRED EMBODIMENTS

Figure 1:
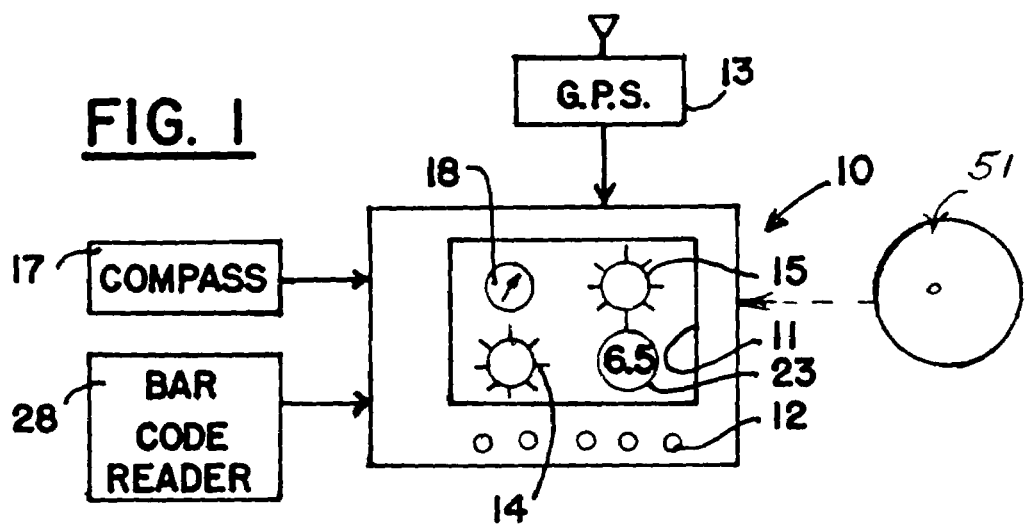
FIG. 1 is a block diagram illustrating one preferred navigation receiver.

Referring to the drawings there is shown in FIG. 1a navigation receiver 10 according to the invention adapted to be provided within a vehicle for viewing by the vehicle operator. As shown, the receiver 10 has a visual display screen 11 and a keypad 12 with keys for enabling a vehicle operator to enter the geographical coordinated of a selected destination. The receiver 10 receives the wirelessly transmitted GPS signals at 13, and it displays the current location of the vehicle by a flashing light dot 14 on the screen 11. The different X-Y coordinate positions on the screen 11 represent and correspond to the geographical locations of the zone or area being traveled by the vehicle. Accordingly, as the vehicle proceeds from location-to-location within the zone, the flashing light dot 14 correspondingly changes its X-Y position on the receiver screen 11. The operator of the vehicle enters a selected X-Y destination location by its zone coordinates into the keypad 12, and the destination location is displayed on the screen 11 by a second flashing light dot 15, as shown in FIG. 1. Thus the displacement or distance between the two dots 14 and 15 corresponds to the distance between the present location of the vehicle and that of the desired destination, and the angle or heading displacement between the two dots 14 and 15 corresponds to the heading direction that should be followed by the vehicle to reach its selected destination. If the vehicle proceeds in the correct direction toward its destination, the dots 14 and 15 on the screen 11 are seen to converge toward each other. On the other hand, where the vehicle detours away from such direct heading to destination, the vehicle location dot 14 diverges away from the fixed dot 15 on the screen 11. Thus by continually observing the display screen, the vehicle operator can determine whether the vehicle is correctly approaching toward the selected destination or proceeding away from the selected destination, and can therefore continuously or incrementally be informed of the correct heading to follow toward the selected destination.

The receiver screen 11 may display a map of the area, zone, or other region being traveled by the vehicle, with the X-Y coordinated of the dots 14 and 15 being located on such map at the correct street or road locations. However, according to the invention, such map display is unnecessary, since the operator of the vehicle need only note the relative positions of the two flashing light dots 14 and 15 on the screen 11 and control the vehicle direction in order to bring about convergence of the two dots 14 and 15 on the screen toward each other.

As thus far described therefore, the vehicle operator need only note the distance and direction between the two light dots 14 and 15 on the screen as the vehicle proceeds from location to location, and control the vehicle heading so as to continually or incrementally head toward the selected end destination. Returning to FIG. 1, the vehicles compass heading can be shown by a heading display vector 18 on the screen 11 (provided by an electronic compass 17 energizing the receiver 10.)

In operation, as the vehicle proceeds from each location to the next, the light dot 14 shows such movement on the screen 11 to continually show the vehicle location on map displayed on the screen, or merely its X-Y coordinate location on the screen 11 without a map display. Whenever, the vehicle deviates from a correct heading direction, due to traffic congestion, road repairs, accidents, or any other reason, the dots 14 and 15 on the screen 11 diverge away from each other, and a new directional heading is required to be followed by the vehicle to reach its selected destination. Thus the vehicle can be incrementally guided from any location to another by controlling its heading direction alone to reach a desired destination.

Audible Guidance

Figure 2:
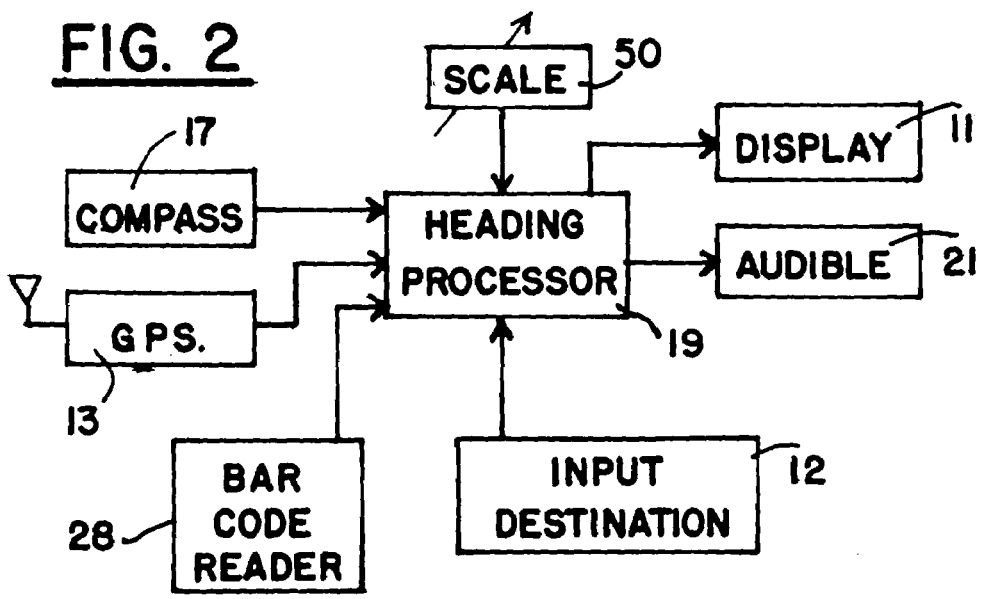
FIG. 2 is a block diagram showing portions of a modified receiver.

In the above described embodiment, the vehicle is guided by the vehicle operator continually, or incrementally, by changing its direction, as needed, by viewing the relative locations of the dots 14 and 15 on the receiver screen 11. However, such visually controlled guidance has the disadvantage of periodically diverting the vehicle operator's attention away from the street or road in un front of the vehicle in order to view the receiver screen 11. Such diversion can, of course, be minimized by employing a "heads-up" type of display from the receiver (not shown) where the receiver display is projected on the windshield or viewing window normally used by the vehicle operator to view the roadway and traffic immediately ahead of the vehicle. Alternatively, or additionally, such directional guidance may be provided by audible instructions from the receiver to the vehicle operator as shown in FIG. 2. Referring to FIG. 2, the receiver 11 may include a directional heading processor 19 that receives the changing vehicle location signal (from GPS 13 or bar coded sign reader 28, as discussed below) and receives the destination signal from the keypad entry 12, to continually calculate the correct heading that should be followed by the vehicle to reach its selected destination. The processor 19 also continuously receives the compass heading signal 17 providing a reference heading of the vehicle. The processor 19 then compares the actual heading of the vehicle with the direction heading required to reach its selected destination to energize an audible generator 21, continually announcing instructions to turn left or right, as needed, to bring the vehicle to a correct heading. Where the deviation of the vehicle from the correct heading is substantial, the processor 19 is programmed to issue a repetitive series of left turn or right turn commands until the vehicle is restored to its correct heading direction.

The navigation receiver 10 may provide both a visual display of direction and distance as shown by FIG. 1 and described above, and an audible announcement as shown in FIG. 2 and described above. If desired, the heading processor 19 may also calculate the distance between the present location of the vehicle and the selected destination location, and this calculated distance may be displayed on the receiver screen 11 as a number 23, as shown, and may also be announced by audible generator 21 (FIG. 2) for each different location as the vehicle proceeds. Such displayed distance number 23 assists the vehicle operator in estimating the time of arrival at the selected destination.

Within Zone Navigation

Figure 3:
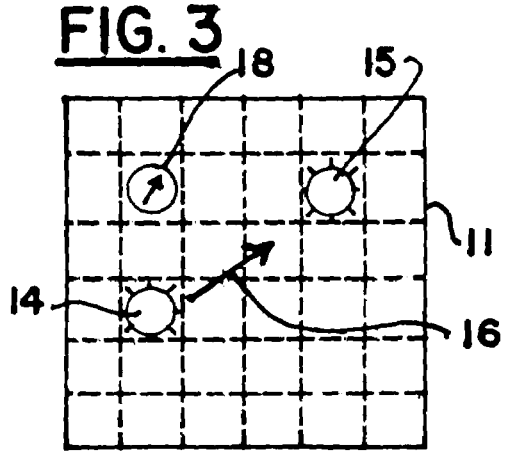
FIG. 3 is an enlarged view of the receiver screen with guiding display.

In the above described embodiment the navigation system provides visual and/or audible guidance of the vehicle between the different geographic zones of the city or other community as shown by the cross hatched zones in FIG. 3. Each zone may comprise an area of three or four square street blocks of the city, or an equivalent area elsewhere. After reaching the zone of the selected destination, the receiver may then be changed to provide a different display and/or audible announcement, that conveys more specific information to guide the vehicle directly to a selected street and ultimately to a specific address on such slected street.

Figure 4:
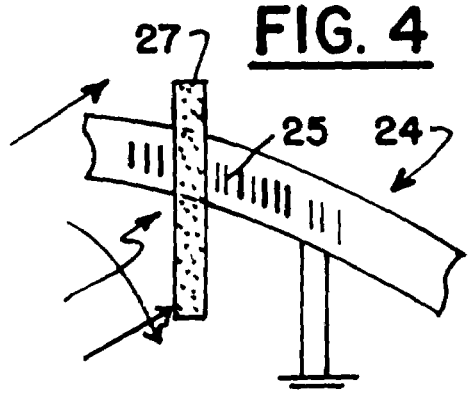
FIG. 4 is a schematic illustration of a bar coded street or road sign with scanning light beam.

To provide this more detailed guidance, each street or road intersection is provided with a coded sign 24, as shown in FIG. 4, that may be embedded in the roadway as shown in FIG. 9 being traveled by the vehicle, or may be provided as an upright sign 24 located near the shoulder of the road or otherwise near the roadway being traveled by the vehicle. Each such sign 24 contains a bar code 25 that identifies the zone of the city and the street or roadway being traveled by the vehicle together with additional information pertaining to the location of that sign 24, such as nearby intersecting streets and roads. According to the invention, the vehicle 30 (FIG. 5) is provided with a wireless reader 28, as shown in FIG. 2, and FIG. 5, to read each of these coded signs 24 as it passes the location of each such sign 24. As shown in FIG. 4, the wireless reader generates a short range wireless beam 27 that scans each sign 24 as the vehicle passes by that sign, thereby to reflect the bar coded information back to the navigation receiver 10 (FIG. 2) and its heading processor 19 (FIG. 2). Thus as the vehicle 30 proceeds from street to street within each zone, its wireless reader 28 successively scans and reads each of the fixed bar coded street signs 24 along its route to continually receive detailed information concerning each different location of the vehicle.

In one embodiment, illustrated by FIG. 6, the detailed information on each sign 24 preferably includes the names of three or more streets or road intersections immediately ahead of each sign 24, as well as those of a series of streets on each side of the vehicle, and those behind the vehicle 30. All of such street information being read from each sign 24 is displayed on the receiver screen 11 as shown in FIG. 6. Still further, the signs 24 may also contain or reference, information about each such street or roadway, as shown by the display illustrated in FIG. 7, such as whether each such street 32 has parking available 36, or whether each such street 33 has traffic flow restrictions, such as a one way passage restriction 37 and the direction thereof. Still further the signs 24 may also contain information such as the availability of gasoline 39 on any street, or other service facilty, and also the range of street numbers 40 on each street, as shown, to better enable guidance of the vehicle 30 directly to a desired street address.

Thus in summary, each of the fixed coded street or roadway signs 24, containing or referencing the detailed street and traffic control information, is read by passing vehicles and the information from each sign is displayed on the vehicle navigation screen 11. This assists the vehicle operator in navigating directly to a desired street despite traffic restrictions, such as one way passage, or roadway repairs or the like. The signs also notify the operator of the vehicle of the availability of parking facilities, gasoline or service facilites on the different streets whereby the vehicle is not delayed in looking for such needs. It will be appreciated that such detailed guidance information not only assists the vehicle operators in promptly reaching a desired destinations as well as in parking or refueling, as may be necessary, but also assists other vehicles by reducing traffic delays. For example, whenever a vehicle is required to stop or delay seeking a parking location or fuel or other service, any such delay also progressively delays other vehicles that may be traveling behind such vehicle. Accordingly the more rapidly that each vehicle can proceed directly to its desired destination reduces traffic delays and congestion for all other travelers proceeding along that roadway.

As discussed above, the coded signs 24 also contain, or reference, the range of street addresses 40 (FIG. 7) on each street or roadway, and therefore directly guide the vehicle 30 to a desired address. However, during conditions of poor visibility, the address numbers on different buildings may not be readily visible to the vehicle operator resulting in delays in finding a correct building or street location. To avoid this difficulty, the buildings 41, 42 on each street may also be provided with a coded sign 43, 44 to identify such building, as shown in FIG. 8. Referring to FIG. 8, each building 41 and 42 may have its own bar coded sign 43 and 44, respectively, that identifies, or references, that building address as well as providing additional information about that building. Passing vehicles 30 can scan and read such building signs 43, 44 in the same manner as reading the street signs 24, discussed above, and the identity of such buildings can be displayed on the navigation receiver screen 11 to assist the vehicle operator in finding the desired street address and/or building despite poor visability conditions.

As thus far described the vehicle can be promptly and easily navigated to a selected location in a two part process. Initially the vehicle can be incrementally guided from any zone to another zone within a city or community by merely following the directions shown between two flashing light dots on the vehicle screen 11 and/or by following the corresponding audible instructions from the vehicle audible generator 21. Upon reaching the zone of the selected destination, the vehicle operator may then switch the receiver, using the keypad 12 (FIG. 1) to a different display on the receiver screen 11 that responds to the system reading each of the coded street signs 24 to continually show the names of the streets around the vehicle and information pertaining to each of such streets. Upon reaching a desired street the vehicle operator can locate a desired address on that street by observing a different display upon the screen 11 that is obtained by the reader 28 scanning and reading the codes from the coded signs 43, 44 provided on the buildings 41, 42 (FIG. 8).

It will be recalled from the above description that the guidance of the vehicle from zone to zone may be performed using the GPS satellite transmissions that are received by the navigation receiver 10 (FIG. 1) to continually provide the changing location of the vehicle as it proceeds. However, the GPS signals provide only location information and not the additional guidance information about the streets, roads, traffic conditions and the like as discussed above (FIGS. 6 and 7). Since the coded street-road signs 24 also contain, or reference, the location information, as well as all of the additional information discussed above, the coded street signs 24 may be used alone without the GPS signals for navigating from zone to zone as well as in navigation to specific locations within each zone. Of course, in outlying areas, or in small cities, or villages where the coded street signs 24 may not available, the GPS transmissions can be employed for zone to zone navigation purposes, and the vehicle operators can rely upon observing conventional road and street signs to locate streets, and addresses on said streets as well as to locate gas stations and the like. Of course, where the coded street signs are available, the system can employ both the GPS transmissions and the reading of the coded street signs 24 for navigating purposes.

Audible Information Supplements

Audible guidance of a vehicle provides the advantage of permitting an operator to give full time and attention to roadway conditions without diverting the operator's attention to viewing a vehicle installed display screen from time-to-time. Accordingly, as each of the coded street signs 24 is scanned and read to the receiver 10, or as each of the building signs 43, 44 are scanned and read by the vehicle reader 28, the receiver audible generator 21 (FIG. 2) may announce the names of the streets or building addresses, or of the roads or streets around the vehicle as well as the other information as discussed above. Such information can also be concurrently displayed on the screen 11 as shown in FIGS. 6 and 7. Such audible announcements alert the vehicle operator to the approaching streets, or provide other information, that may have been overlooked by failing to note it on the receiver screen 11. Similarly other information being read from the coded street-road signs 24 or building signs 43, 44 may also be audibly announced for the same reasons, to not only inform the operator of such information but also to alert the operator and insure that such information has not been overlooked.

Coded Street Signs and Reader

As discussed above the bar coded signs 24 identify the zone locations of each sign and contain, or reference, other information to be displayed, and/or audibly announced, to the operator of the vehicle. These signs are adapted to be located along the streets and roadways, or embedded in the the roadways, near the passing vehicles to permit reading of the signs 24 by code readers 28 carried by the vehicles. The signs may alternatively be located above the roadways, supported by cables or structure that support stop lights or conventional signs. For more positive reading of the coded signs 24, the codes may be formed of retro-reflective materials for better reflection. Bar code readers 28 for use in the present invention are available as laser scanners that can read signs of reasonable size and dimensions at distances from such signs up to 33 feet away. Among other models the WORTH DATA LZ100 and LZ200 models are considered to be satisfactory for such uses.

As is known, the bar codes being illuminated by the laser beams of the readers 28 are reflected back to the navigation receiver 10 to read such codes. These codes also contain, or reference, the the street names, traffic controls, and other information, as discussed above, that is relevant to the location of each sign 24. Where the information to be conveyed exceeds the capacity of the signs 24, such additional information can be stored in memory in the navigation receiver 10 at addresses corresponding to the codes on the signs 24, As each code is read, such additional information (FIGS. 6 and 7) can be downloaded from the receiver memory to be displayed on the screen. Detailed zone maps stored in the receiver memory (not shown) may alternatively be selected for display upon the code readers reading the coded signs.

Displays in Different Scale

Since the areas covered by different cities or towns vary significantly in size from one another, the present invention provides for differently scaled displays on the receiver screen 11. The differently scaled displays may be selected by the vehicle operator using the receiver keypad 12, and/or adjustment 50 (FIG. 2) to cover an entire region or a portion of such region. Thus where the vehicle is located at a great distance from a selected destination, the scale may be correspondingly selected to view the flashing light dots 14 and 15. Whereas when the vehicle proceeds near the desired destination zone the scale can be varied to more precisely navigate toward the the destination, to better show the correct heading. Such reduction or enlargement of the scale of distances may also be performaed automatically using the heading processor (FIG. 2) to calculate the distances between present vehicle location and the location of the destination.

Where maps of the city or portions thereof are being used for display, yhe map areas being selected may also be varied manually or automatically to show details of the region in greater or lesser detail.

Traffic Restrictions

As discussed above the coded signs 24 may also contain, or reference, various traffic control information, such as one way streets, dead end streets, street numbers, names, and others. Still further such signs 24 may also contain, or reference, speed limits, stop lights or stop signs, curving roads, and other information that is now made available only by visually readable signs. As such coded signs are remotely read by the vehicle readers, such information is displayed on the interior navigation screen 11 and can also, or alternatively be audibly announced by the receiver audible announcer 21. Accordingly during periods of poor visibility, the vehicle operators can be provided with such information on the illuminated navigation receiver screen 11 when such information is not otherwise visible. Such internal communication of such information also provides a reminder to the vehicle operator where the corresponding externally visible signs have been overlooked.

Other Digitally Coded Signs

According to the invention, digitally coded street-road signs can also be employed for purposes other than vehicle navigation to assist vehicle operators in complying with traffic laws, to notify operators of road conditions, and to otherwise provide the same functions as are presently provided by conventional road signs now commonly provided on many streets and roads. For example, conventional street-road signs that visually notify operators of speed limits, or of stop lights, or stop signs, can be modified or replaced by having such visually readable signs also bear the same information in digitally coded form, thereby to enable such signs to be automatically read by the vehicle scanners 28 (FIGS. 1 and 2) of passing vehicles. Thus as such vehicles pass each such sign, the coded information is read by the vehicle scanner 28, and its content is displayed on the receiver screen 11 and/or announced by the vehicle audible announcer 21.

Since the content of conventional street-road signs of this type are uniform throughout the United States, the contents of all of such different conventional signs may be prestored in a memory 51 of the vehicle receiver 10 (FIG. 1) with each different message being stored at a unique different address of the memory 51. Each different street-road sign may then contain, in coded form, the address of the message that is appropriate at the location of that sign, whereby upon reading the code of each sign, the corresponding message is downloaded from the memory 51 to be displayed and/or announced from the receiver 10.

The ROM memory 51 may contain maps, places of interest, and additional information of assistance to the vehicle operator, all of which can be accessed upon the vehicle reader 28 reading the digital code or codes provided on the street-road signs. Thus at each different location along the streets or roadways, the digital code or codes on the sign at that location accesses the messages and information stored in the receiver ROM memory and related to that location. As is illustrated in FIG. 1, the ROM memory 51 may be in the form of a removable disc or other removable memory, and one or more of such memories may be provided for each vehicle depending upon the extent of information desired to be made available to the vehicle operator. Such digitally coded street-road signs may be used alone for navigation and other purposes as described above, or their use may be supplemented by the use of the received G.P.S. signals 13 as shown in FIGS. 1 and 2.

Many changes and variations may be made without departing from the present invention. Accordingly this invention should be considered as being limited only by the following claims.

What is claimed is:

1. A non-computing navigation system for guiding a driver operated vehicle to a selected destination communicating only an uncluttered two location representation of the changeable location of the vehicle referenced to the fixed location of the destination, and wherein the system does not provide any specific routing path between the two locations but instead enables the driver to select any routing path guided only by the two location representation, detecting means for continually detecting exteriorly of the vehicle the changeable location of the vehicle, display means energized by said detecting means and responsive to a driver chosen destination to continually display only a pair of uncluttered markings corresponding to the changeable vehicle location and that of the fixed destination location, said display being free of any routing path interconnecting the two locations, said markings being displayed within the vehicle in such manner that they can be continually observed by the driver without diverting attention from safe driving of the vehicle.

2. In the system of claim 1, said driver operated vehicle having an observation window for observing roadway conditions, and said two location display being applied to said window to enable continuing viewing of said markings while observing the roadway conditions.

3. In the system of claim 1, said system providing a second phase of operation when the vehicle nears the destination, in said second phase of operation, digital sensor means for detecting digital codes on landmarks near the destination, which landmarks may include individual buildings to identify said landmarks, said digital sensor means energizing said display means to superimpose an identification of said landmarks on said markings when the vehicle nears said destination, whereby the vehicle is continually guided solely by the two markings on the display supplemented by the landmark identification when the vehicle nears the destination.

4. In the system of claim 1, said detecting means comprising a digital reader for detecting digitally coded markings located at geographically spaced locations exteriorly of the vehicle.

5. A non-computing navigation system for a driver operated vehicle for continually guiding the vehicle to a selected destination without following any predetermined, calculated routing path, said system providing an uncluttered map-free display of only two discrete markings, the first marking corresponding to the changeable geographic location of the vehicle regardless of the route followed by the vehicle, and the second marking corresponding to a fixed geographic location of a selected destination, said navigation system being free of computation of any predetermined route path for the vehicle to follow to said destination, and the two discrete markings providing the sole guidance by the navigation system until the vehicle nears said destination, said display of the two markings being provided within the vehicle in such manner that they can be observed without diverting attention away from safe operation of the vehicle.

6. In the system of claim 5, said vehicle having a conventional viewing window to permit viewing of the streets and roads ahead of the vehicle, and the display of the two discrete markings being applied to said window, thereby to minimize distraction in operation of the vehicle by the driver.

7. In the system of claim 5, the display of the two markings on the screen being enlarged in scale as the vehicle approaches closer to the destination, thereby to more accurately guide the vehicle.

8. A two phase navigation system for assistance in guiding a driver operated vehicle to a selected destination along any travel route selected by the driver of the vehicle leading toward said destination, and wherein during a first phase said system continually communicates an uncluttered representation of only two markings corresponding to the changeable location of the vehicle and the fixed location of the destination until the vehicle nears the destination, and in a second phase, said system communicates as a supplement to said markings, local landmark information that may include an identification of an individual building, whereby during both of the two phases, the driver can choose any route to the destination that is available or convenient, said system comprising:

in said first phase, detection means for continually determining the actual geographic location of the vehicle referenced to the geographic location of the destination and communicating said two geographic locations by only two markings exclusive of any other communication, two markings exclusive of any other communication, and in the second phase, when the vehicle has neared the location of the destination, sensor means for detecting actual landmark information that may include an individual local building structure, as a supplement to the communication of the two markings, whereby during both of the two phases, the driver can choose any available routing path toward the destination and continually receive advisory guidance from the system to assist in reaching said destination.

9. In the system of claim 8, said detection means including a visual display screen within the vehicle and means for energizing said display to show only a pair of markings corresponding to the geographic location of the vehicle and the geographic location of the destination, thereby to continually advise the driver of the heading direction to reach the destination regardless of the routing path followed by the vehicle.

10. In the system of claim 8, said detection means including an audible generator for communicating said markings and said landmark information.

11. In the system of claim 8, said driver operated vehicle having an observation window for enabling the driver to view roadway condition, and display means for applying said two markings to said window.

12. A two-phase, non-computing, advisory navigation system for guiding a driver operated vehicle to any selected destination, and enabling the driver to select any travel routing to said destination that is available or convenient, said system comprising:

a direction communicating means within the vehicle for continually advising of the heading direction to be followed for any travel routing selected by the driver, said direction communicating means comprising detector means for continually determining the actual geographic location of the vehicle referenced to the geographic location of the destination, and including a communicating means energized by said detector means to generate a map-free display within the vehicle displaying only two discrete markings corresponding to said location of the vehicle and the location of the destination, thereby continually advising of the heading direction to be followed to said destination regardless of the travel route selected by the driver of the vehicle.

13. In a navigation system for a driver operated vehicle means for enabling the driver of the vehicle to select any available routing to reach a selected destination while continuously providing guidance to the driver to assist in reaching said destination, said means comprising a communicator means for conveying a first uncluttered, discrete communication corresponding to the changeable geographic location of the vehicle at all locations along any routing chosen by the driver, and said communicating means conveying a second uncluttered, discrete communication corresponding to a fixed geographic location of a destination selected by the driver of the vehicle, said first and second communications being map-free and exclusive of other communications by the guidance system until nearing the location of the selected destination, whereby said first and second discrete location communications continually inform the driver of the vehicle of the location of the vehicle referenced to that of the destination to guide the vehicle toward said destination regardless of the routing chosen by the driver of the vehicle.

14. In the system of claim 13, said communicator means comprising a visual screen, and said first and second uncluttered communications comprising first and second discrete visual markings on the screen exclusive of any other visual presentation on the screen.

15. In the system of claim 13, said communicator means comprising an imaging device providing first and second discrete visual markings corresponding to said first and second uncluttered communications, said imaging device applying said visual markings to the driver without diverting attention away from proper driving of the vehicle, said uncluttered discrete markings exclusive of other visual presentations from the imaging device requiring minimized attention of the driver of the vehicle.

16. In the system of claim 13, the addition of sensor means for detecting digital markings on landmarks and structures in the vicinity of the selected destination, which landmarks and structures may include specific buildings and building addresses, said sensor means energizing said communicator means to supplement said uncluttered communications with the identity of said landmarks and structures when the vehicle is in the vicinity of said destination.

17. A non-computerized navigation system for a driver operated vehicle wherein the system communicates to the driver an uncluttered, map-free, representation limited only to the comparative geographic location of the vehicle referenced to the geographic location of a selected destination, and wherein the system does not compute any selected routing path for the vehicle to follow to reach said destination, comprising:

detecting means for receiving actual external information that continually identifies the changeable actual location of the vehicle, communicating means energized by said detecting means and responsive to the inputting of said selected destination for communicating a map-free, uncluttered representation consisting solely of the geographic location of the vehicle and the geographic location of the destination, said communicating means providing only two discrete, displaced marking locations until the vehicle nears the location of the destination.

18. A non-computing, two phase navigation system for driver operated vehicles for enabling the continual guiding of the vehicle to a selected destination by heading direction alone during a first phase without reference to any selected routing path, and in a second phase occurring when the vehicle has arrived in the near vicinity of said destination, guiding the vehicle to the destination along any routing selected by the driver, by communicating localized information specific to the landmarks of the areas about the destination comprising:

in the first phase, communicating means for continually conveying a map-free uncluttered representation corresponding only to the relative geographic location of the vehicle referenced to the selected destination, thereby enabling the vehicle to proceed toward the destination along any routing chosen by the driver by heading direction alone without following any predefined routing of streets, roads, or road intersections, and in the second phase occurring when the vehicle has neared the vicinity of the destination, communicating local landmark information near the destination to enable the vehicle to be guided directly to the destination by the local landmark information along any desired routing.

* * * * *